United States Patent
Suzuki et al.

(10) Patent No.: US 7,449,798 B2
(45) Date of Patent: Nov. 11, 2008

(54) CO-GENERATED POWER SUPPLY SYSTEM

(75) Inventors: Yasunobu Suzuki, Tokyo (JP); Toru Teshima, Kanagawa (JP)

(73) Assignee: I-Hits Laboratory, Kanagawa (JP)

( * ) Notice: Subject to any disclaimer, the term of this patent is extended or adjusted under 35 U.S.C. 154(b) by 174 days.

(21) Appl. No.: 10/630,692

(22) Filed: Jul. 31, 2003

(65) Prior Publication Data
US 2004/0066094 A1   Apr. 8, 2004

(30) Foreign Application Priority Data
Aug. 1, 2002   (JP)   ............................. 2002-224787
Jul. 28, 2003   (JP)   ............................. 2003-280883

(51) Int. Cl.
*H02J 1/00* (2006.01)
(52) U.S. Cl. .......................................... 307/65; 307/66
(58) Field of Classification Search ................. 320/138; 307/18, 19, 23, 65, 66
See application file for complete search history.

(56) References Cited

U.S. PATENT DOCUMENTS

| | | | | |
|---|---|---|---|---|
| 5,334,877 | A | * | 8/1994 | Mohan et al. .................. 307/46 |
| 5,686,766 | A | * | 11/1997 | Tamechika .................... 307/43 |
| 5,856,712 | A | | 1/1999 | Suzuki et al. |
| 6,067,243 | A | | 5/2000 | Suzuki et al. |
| 6,184,593 | B1 | * | 2/2001 | Jungreis ....................... 307/64 |
| 6,602,627 | B2 | * | 8/2003 | Liu et al. ...................... 429/23 |
| 6,608,404 | B2 | * | 8/2003 | Schienbein et al. ........... 307/82 |
| 6,639,328 | B2 | * | 10/2003 | Wacknov ..................... 290/52 |
| 2001/0004170 | A1 | * | 6/2001 | Schienbein et al. ........... 307/18 |
| 2003/0160454 | A1 | * | 8/2003 | Manolis et al. ............. 290/1 R |
| 2003/0167105 | A1 | * | 9/2003 | Colborn ...................... 700/295 |
| 2004/0044442 | A1 | * | 3/2004 | Bayoumi et al. ............ 700/286 |

FOREIGN PATENT DOCUMENTS

JP          09051638 A  *  2/1997

OTHER PUBLICATIONS

Suzuki et al., "An approach to the AC to AC/DC converter," IEEE 1996 (Boston U.S.A.), pp. 434-441.
Suzuki et al., "High-Performance UPS Based on AC-to-AC Converter," IEEE 1998 (San Francisco U.S.A.), pp. 754-761.
Ariyoshi et al., "Load Leveling Using EDLCs under PLL Control," IPEC—Tokyo 2000 (Tokyo—Japan), pp. 676-681.

* cited by examiner

*Primary Examiner*—Michael J Sherry
*Assistant Examiner*—Daniel Cavallari
(74) *Attorney, Agent, or Firm*—Wenderoth, Lind & Ponack, L.L.P.

(57) ABSTRACT

In a co-generated power supply system for performing dispersed power supply to a load, a wind turbine generator, a solar cell and a fuel cell whose rated voltages are made equal to a rated voltage of a storage battery are used as DC power sources. These DC power sources, a commercial AC power source and the load are connected to each other via a bi-directional electronic transformer. Thus, the co-generated power supply system, in which the electric power of a natural energy system having many fluctuation factors is combined with stable electric power such as a load leveling battery or a fuel cell, allows the stable electric power to be supplied to the load via the electronic transformer commonly, thereby reducing the cost and enhancing the performance of the entire system.

2 Claims, 16 Drawing Sheets

(a)

(b)

(c)

CO-GENERATED POWER SUPPLY SYSTEM

BACKGROUND OF THE INVENTION

1. Field of the Invention

The present invention relates to a novel co-generated power supply system, which is useful for co-generated power supply of a combination of natural energy and stable energy such as a fuell cell and power storage energy during the nighttime and midnight, and especially, which can efficiently supply electric power to a load by connecting a plurality of AC and DC energy sources to each other via an electronic transformer, a diode and an OR circuit.

2. Description of the Related Art

As a typical example of clean energy, the solar cell has been prevalant. Furthermore, the wind turbine generator has been introduced in local regions. Since in these types of natural energy, the duration of sunshine, the operation rate of a windmill or generated electric power fluctuates at all times due to variations in weather or meteorological situations, it is difficult to stably supply electric power. Therefore, natural energy is used as an auxiliary energy source while commercial electric power is mainly used in many cases under current circumstances.

However, an electric power supply system in the 21st century in which global warming is suppressed has been studied in a global scope, and thus, various types of efficient electric power supply means by co-generated power supply in closer touch with a consumption region have been studied in addition to conventional concentrated power generation by nuclear energy, thermal energy or hydraulic energy.

Moreover, in order to perform loadleveling, it is necessary to store surplus energy from a commercial AC line in a battery during nighttime and release this energy for use during daytime so as to efficiently actuate a power generation and distribution system even in the above-described conventional concentrated power distribution systems.

In the meantime, in the field of power electronics, there has been developed an electronic transformer compatible with both AC and DC, which could not achieved by a conventional copper-iron type transformer, and therefore, the electric power can be converted irrespective of the AC and the DC of the energy source. Consequently, the AC power, such as from a commercial power source or wind turbine generation, is combined with the DC power, such as from a solar cell, a fuel cell or a battery, for storing midnight electric power via the electronic transformer, and then, the AC power and the DC power can be used at home, in an office or the like as an uninterruptible power supply for allowing instantaneous power interruption within a half cycle by switching over the energy sources.

Examples of household electric appliances which are currently prevalent in Japan and can be securely used for both of AC and DC include a light bulb, an inverter type fluorescent lamp and an electric tool, and further, there can be used, in principle, inverter types of an air-conditioner, a refrigerator, a microwave oven, a vacuum cleaner, a personal computer and a facsimile except for some types in which a voltage doubler rectifying circuit or an AC protective circuit is incorporated. In contrast, a dimmer, a space heating appliance and an automatic rice cooker of a thyristor phase control system cannot be used with DC under present circumstances. As a consequence, there has arisen an immediate inconvenience that the appliance only for AC and the household electric appliance for both of AC and DC must be used with separate indoor wiring systems (i.e., receptacles) independent of each other.

However, the DC power generation energy always is reversely converted into the commercial AC through an inverter in the conventional system, and then, is converted into the DC again within an actual load, and further, is converted into a high frequency inverter or a variable frequency AC power, so as to drive an electric motor or a compressor, thereby increasing a conversion loss.

FIG. 1 is a diagram illustrating the classification of suitability of AC and DC power supply of conventional household electric appliances in a low-tension power distribution system in the case where AC and DC energy sources are used in a co-generated power supply system, and the relationship between the suitability and conversion efficiency. For example, $\eta_1$, $\eta_2$ and $\eta_3$ represent the efficiency in the case where a fluorescent lamp is lighted by the solar cell; and $\eta_1$, $\eta_2$, $\eta_3$ and $\eta_4$ represent the efficiency in the case where a personal computer or a facsimile is operated.

FIG. 2 is a diagram illustrating a conventional example of a solar cell and a wind turbine generator in a low-tension power distribution system in the case where electric power is supplied directly to a load from AC and DC energy sources. As illustrated in FIG. 2, in the prior art, electric power is supplied directly to both a commercial AC power source and a load via a system linking inverter (popularly called a power conditioner) in the solar cell; in contrast, in the wind turbine generator, since the time fluctuations in generated electric power are sharp, the generated electric power is stored in a storage battery, and then, systems are linked via a bidirectional converter having both of electric charging and discharging functions. In this manner, the solar cell and the wind turbine generator have been configured in systems independent of each other. As to the solar cell, an effective power generation time during the daytime ranges from 6 hours to 8 hours even on a bright day. In contrast, although a weekly or monthly rate of a power generation time in the wind turbine generator greatly depends on seasons or regions, the average rate of the power generation time in Japan is assumed to be smaller than the rate of the power generation time in the solar cell. This is a factor in why the solar cell and the wind turbine generator have not been as prevalent in comparison with in Europe or the U.S.

If control equipment such as an inverter is provided for each electric power of the energy generating source of a low operating rate in the above-described manner, the cost of the entire system is increased, thereby leading to one factor of inhibition of popular use.

SUMMARY OF THE INVENTION

In view of the foregoing, it is the main object of the present invention to provide a novel co-generated power supply system, in which electric power of a natural energy system having many fluctuation factors is combined with stable electric power such as a battery storing midnight electric power or a fuel cell, so that the stable electric power is supplied to a load via an electronic transformer commonly used at a usage rate of almost 100%, thus reducing the cost and enhancing the performance of the entire system, so as to spread and make more prevalent the co-generated power supply and save the energy.

According to the novel co-generated power supply system of the present invention, in the case where the electric power is supplied directly to the load from both AC and DC sources as illustrated in FIG. 3, the efficiency can be enhanced by the amount of removed efficiency A of the inverter in comparison with the prior art illustrated in FIG. 1. Furthermore, although it might be necessary to insert a device used as both insulator and transformer between the commercial AC power source and the co-generated power equipment for the reason of protection, the efficiency $\eta_1$ of the DC-AC inverter of several kilowatts or less including an insulating function is about 90% and the efficiency $\eta_1'$ of the electronic transformer of the same capacity is about 94% to 95%, resulting in $\eta_1 < \eta_1'$. Thus, the system of the present invention can still achieve better efficiency.

BRIEF DESCRIPTION OF THE DRAWINGS

The foregoing and other objects, features and advantages of the present invention will be apparent from the following more particular description of preferred embodiments of the invention, taken in conjunction with the accompanying drawings, in which.

DETAILED DESCRIPTION OF THE EMBODIMENTS

First Embodiment

Figure 4:
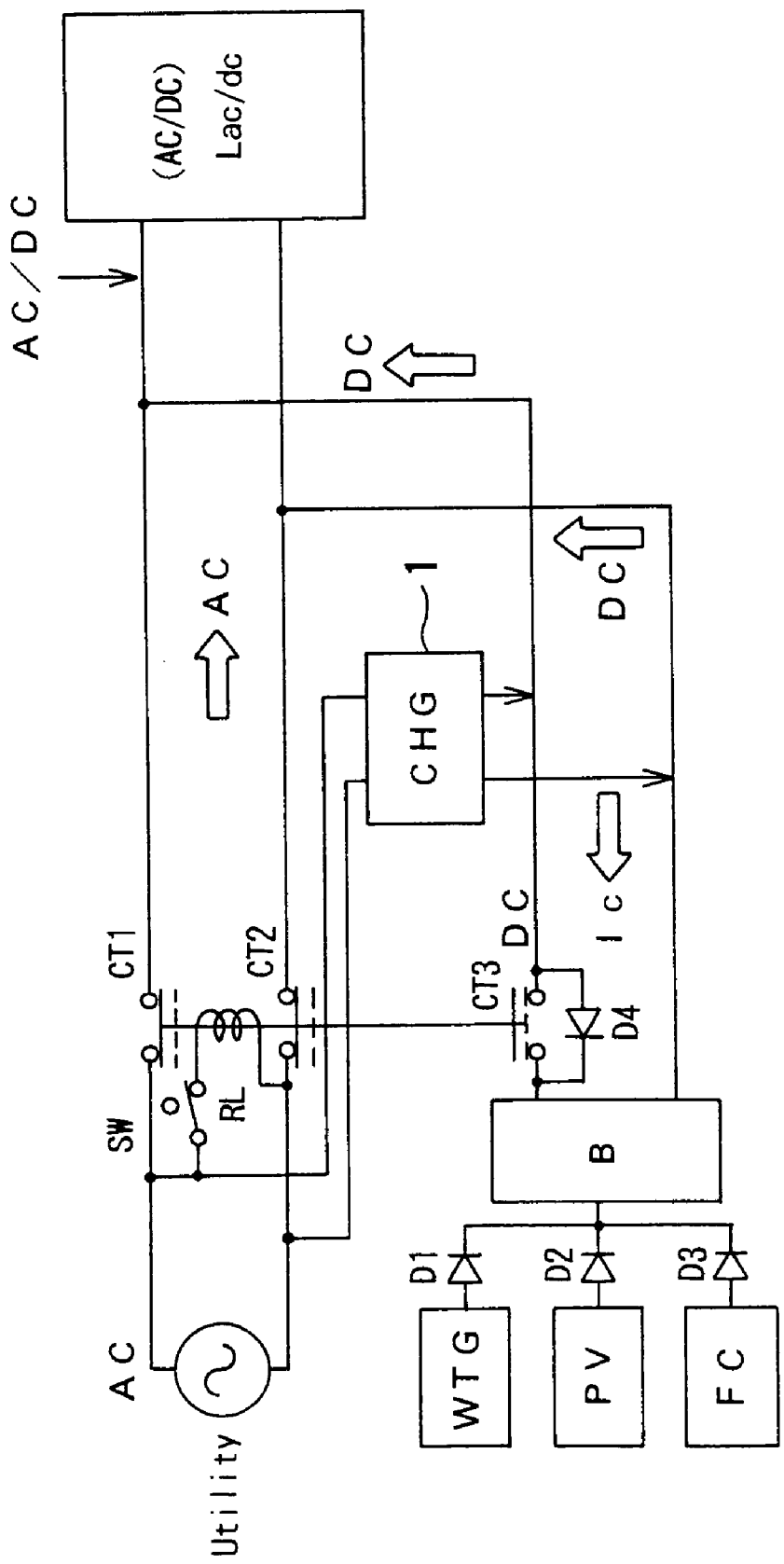
FIG. 4 is a diagram illustrating an embodiment according to the present invention.

FIG. 4 is a diagram illustrating a co-generated power supply system in an embodiment according to the present invention.

In the co-generated power supply system in the embodiment illustrated in FIG. 4, first, DC power sources include a wind turbine generator WTB (Wind Turbine Generator), a solar cell PV (Photo Voltaic) and a fuel cell FC (Fuel Cell) whose rated voltages are made equal to a rated voltage of a storage battery B (Battery). The co-generated power supply system is configured such that AC power from a commercial AC power source Utility is supplied to a load Lac/dc for both AC and DC until the storage battery B is fully charged by the DC power sources WTB, PV and FC; DC power from the storage battery B is supplied to the load Lac/dc for both AC and DC when the storage battery B has been fully charged; and AC power from the commercial AC power source Utility is supplied to the load Lac/dc for both AC and DC as the storage battery B proceeds to be discharged and approaches the terminal period of discharging. In this manner, the DC power supply and the AC power supply are designed to be switched by a control circuit, not illustrated.

The storage battery B is electrically charged normally by the wind turbine generator WTB and the solar cell PV. In the case of insufficient generated electric power, the storage battery B is electrically charged by the fuel cell FC during the daytime; in contrast, the storage battery B is electrically charged via a charger CHG1 during the nighttime and midnight, that is, in a time zone in which an electric charge (tariff) is lower than that during the daytime.

When the storage battery B has been fully charged, a switch SW is opened in response to a command from a control circuit, and an AC relay RL is restored to switch the AC power source to the DC power source, thereby sequentially supplying the DC power to the load Lac/dc for both AC and DC.

As the storage battery B approaches the terminal period of electric discharging (i.e. a minimum charge value), the switch SW is closed in response to a command from the control circuit, and the AC power is supplied again by the commercial AC power source Utility.

Second Embodiment

Figure 5:
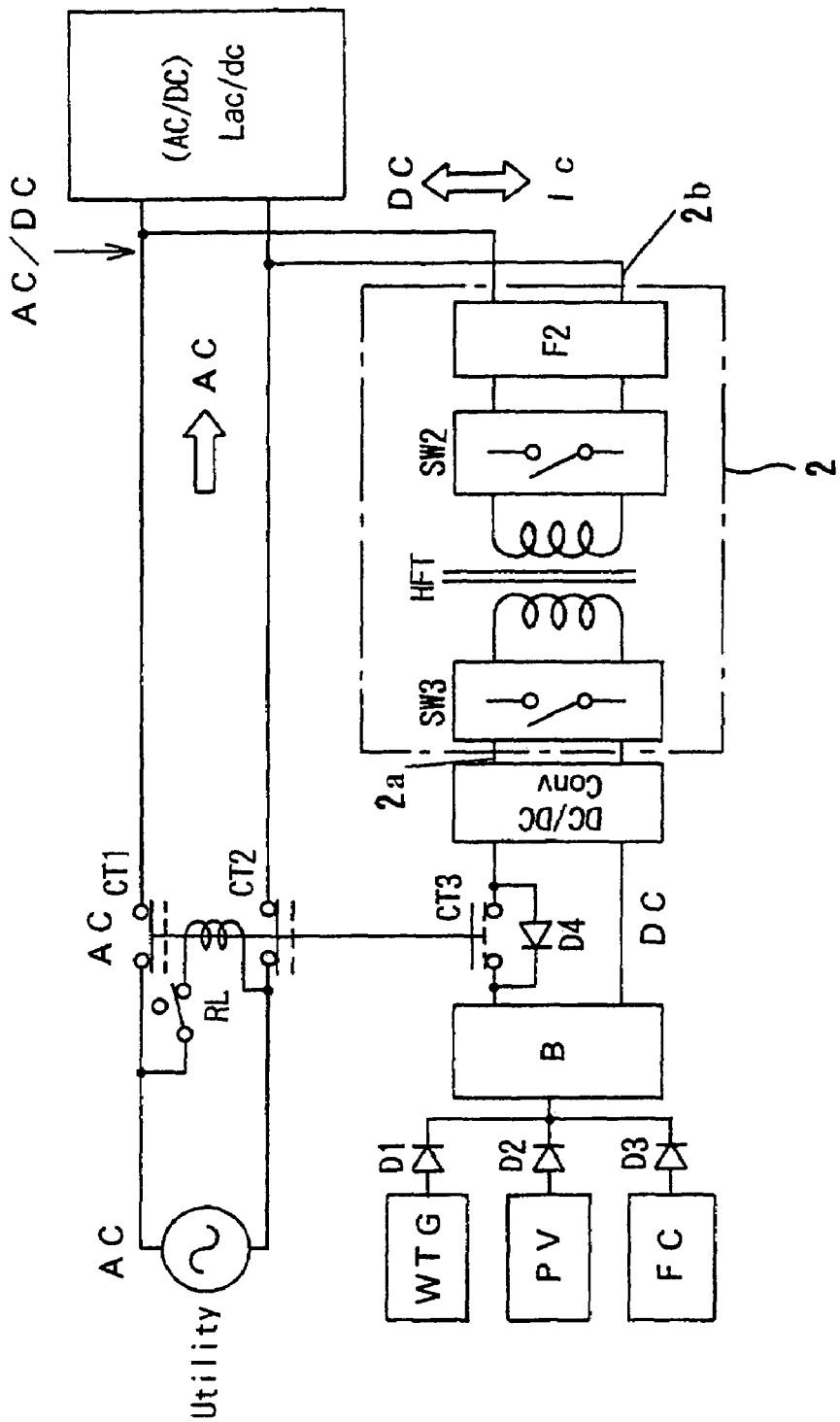
FIG. 5 is a diagram illustrating another embodiment according to the present invention.

FIG. 5 is a diagram illustrating a co-generated power supply system in another embodiment according to the present invention.

The co-generated power supply system in the embodiment illustrated in FIG. 5 comprises a bidirectional DC-DC converter Conv and a two-winding electronic transformer 2. The two-winding electronic transformer 2 includes a high frequency transformer HFT having the function of matching and insulating a voltage on a side of a storage battery and a voltage on a side of a load; modulation/demodulation semiconductor switches SW3 and SW2 which are connected to a coil on the side of the storage battery and a coil on the side of the load and are operated at 10 kHz to 50 kHz; and a filter F2 connected onto the side of the load.

The two-winding electronic transformer 2 is used for both AC and DC and has two bidirectional input/output terminals 2a and 2b. One bidirectional input/output terminal 2a is connected to an output side of a DC power source; in contrast, the other bidirectional input/output terminal 2b is connected in a T-shaped manner between a commercial AC power source Utility and a load Lac/dc for both AC and DC.

With this circuit configuration, AC power from the commercial AC power source Utility is supplied to the load Lac/dc for both AC and DC not via the two-winding electronic transformer 2 until a storage battery B is fully charged by DC power sources WTG, PV and FC; DC power from the DC power sources WTG, PV and FC and the storage battery B is supplied to the load Lac/dc for both AC and DC via the two-winding electronic transformer 2 when the storage battery B has been fully charged or the commercial AC power source Utility fails; the electric power is replenished from the fuel cell FC when the storage battery B is being discharged; the AC power is supplied to the load Lac/dc for both AC and DC from the commercial AC power source Utility in a time zone of the nighttime and midnight electric power supply; and further, the storage battery B is electrically charged by the bidirectional function of the two-winding electronic transformer 2 and the AC/DC converting function.

As for fluctuations in voltage of the storage battery B accompanied by the electric charging or discharging, the fluctuations in voltage of the storage battery B are adjusted for by the voltage adjusting function of the bidirectional DC-DC converter Conv irrespective of the electric charging or discharging time, such that the voltage can be stably supplied to the load Lac/dc for both AC and DC.

Figure 1:
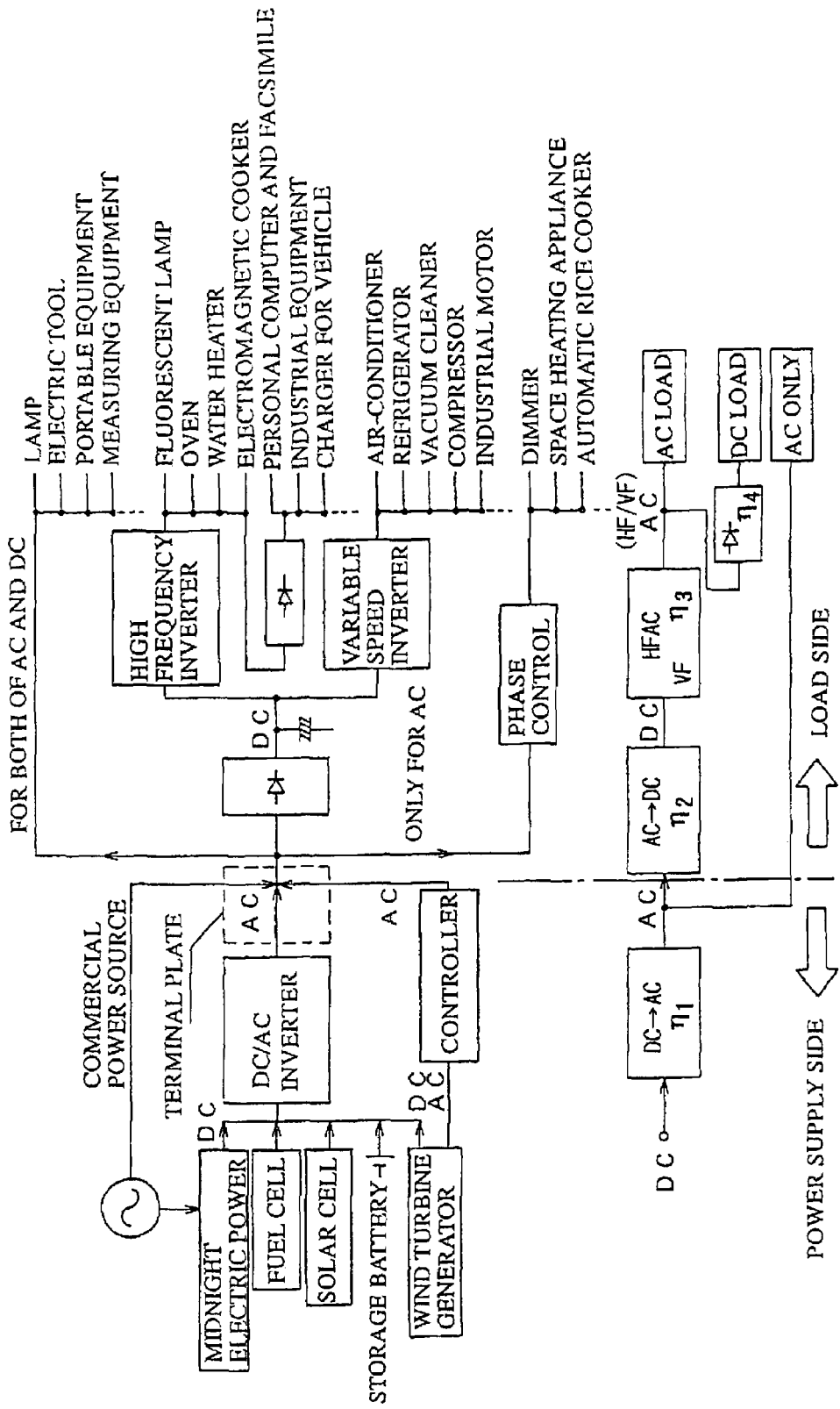
FIG. 1 is a diagram illustrating the classification of suitability of AC and DC power supply of conventional household electric appliances in a low-tension power distribution system in the case where AC and DC energy sources are used in a co-generated power supply system.
Figure 2:
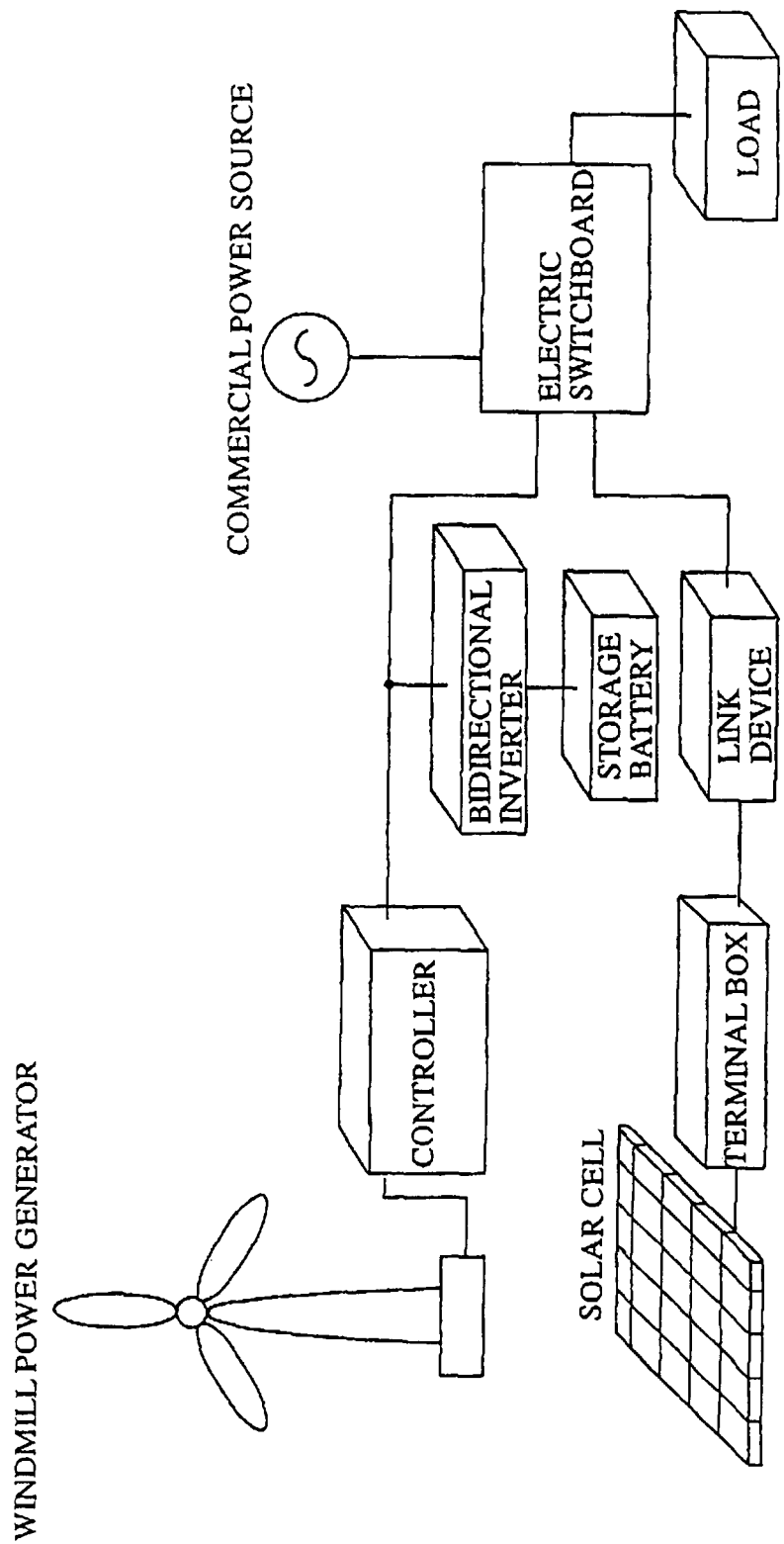
FIG. 2 is a diagram illustrating a conventional example of a solar cell and a wind turbine generator in a low-tension power distribution system in the case where electric power is supplied directly to a load from AC and DC energy sources.
Figure 3:
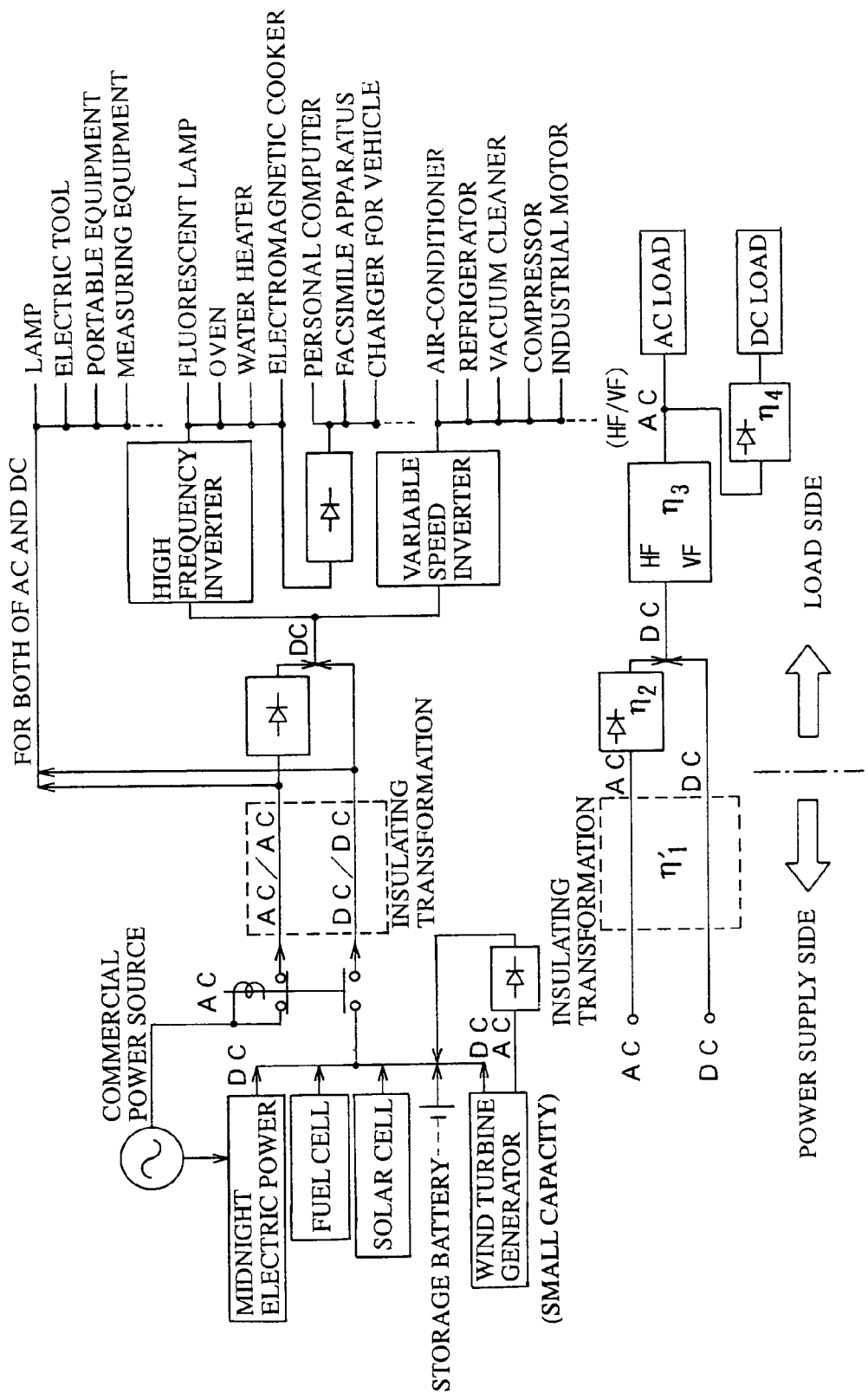
FIG. 3 is a diagram illustrating one example in the case where a power supply system is connected to a load for both AC and DC according to the present invention.

Furthermore, the two-winding electronic transformer 2 can transmit bidirectional energy forward and backward by the bidirectional function and the AC/DC converting function, so that it can function as a charger (i.e., corresponding to the charger CHG illustrated in FIG. 1) for the nighttime and midnight electric power in association with the bidirectional DC-DC converter Conv.

Third Embodiment

Figure 6:
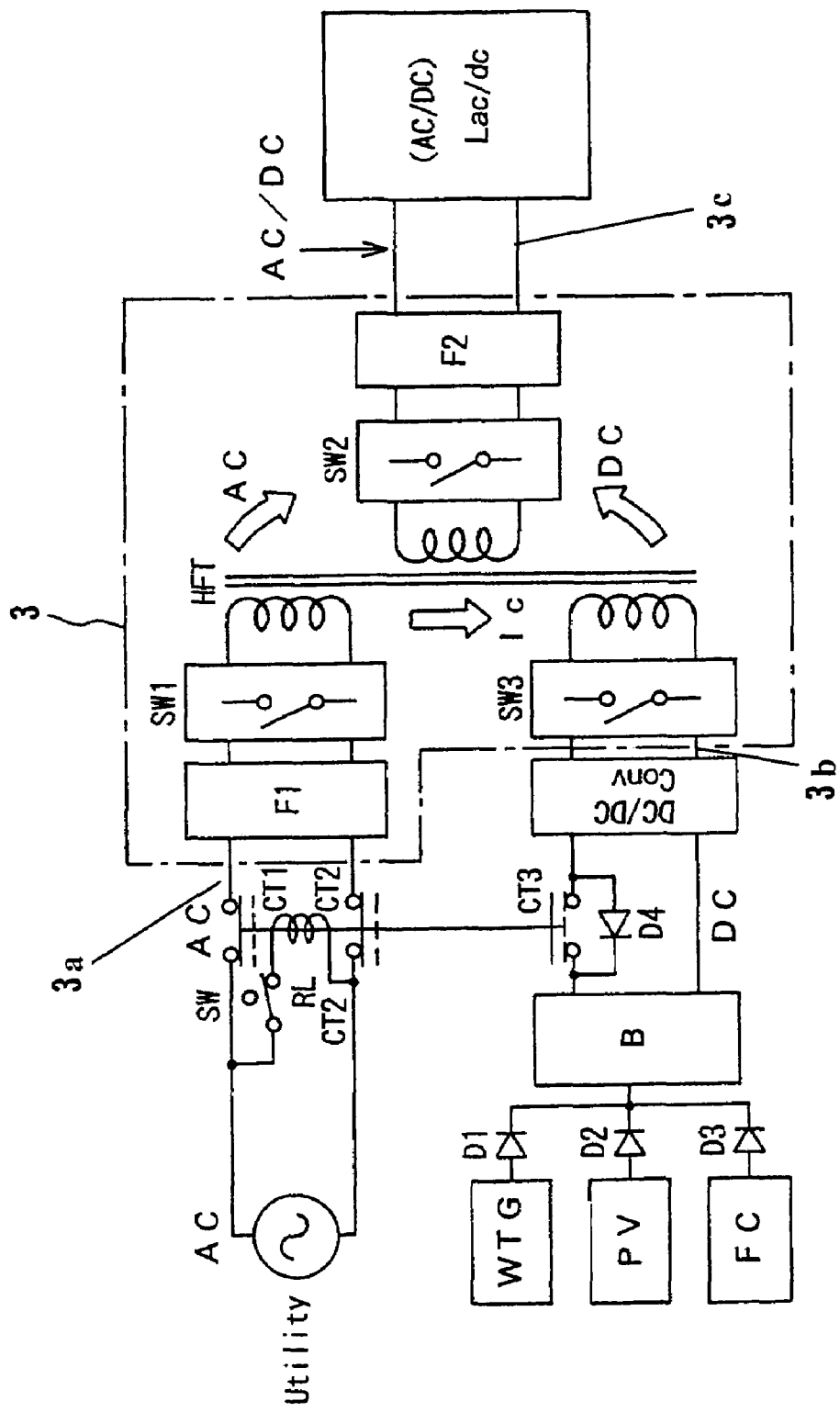
FIG. 6 is a diagram illustrating a further embodiment according to the present invention.

FIG. 6 is a diagram illustrating a co-generated power supply system in a further embodiment according to the present invention.

The co-generated power supply system in the embodiment illustrated in FIG. 6 comprises a three-winding electronic transformer 3 having three bidirectional input/output terminals 3a, 3b and 3c for both AC and DC in order to insulate between a commercial AC power source Utility and a load Lac/dc for both AC and DC and adjust for fluctuations in power source voltage, wherein DC power sources WTG, PV and FC and a storage battery B, the commercial AC power source Utility and the load Lac/dc for both of the AC and the DC are connected in a mutually insulating manner. The three-winding electronic transformer 3 includes a high frequency transformer HFT having the function of matching and insulating a voltage on the side of the storage battery and a voltage on the side of the load; modulation/demodulation semiconductor switches SW1, SW3 and SW2 which are operated at 10 kHz to 50 kHz and are connected to a coil on the side of the commercial AC power source, a coil on the side of the storage battery and a coil on the side of the load; and filters F1 and F2 connected onto the side of the commercial AC power source and the side of the load.

With this circuit configuration, AC power from the commercial AC power source Utility is supplied to the load Lac/dc for both of the AC and the DC via the three-winding electronic transformer 3 until the storage battery B is fully charged by the DC power sources WTG, PV and FC; DC power from the DC power sources WTG, PV and FC and the storage battery B is supplied to the load Lac/dc for both AC and DC via the three-winding electronic transformer 3 when the storage battery B has been fully charged or the commercial AC power source Utility fails; the electric power is replenished from the fuel cell FC when the storage battery B is being discharged; the AC power from the commercial AC power source Utility is supplied to the load Lac/dc for both of the AC and the DC in a time zone of the nighttime and midnight electric power supply; and further, the storage battery B is charged by the bidirectional function of the three-winding electronic transformer 3 and the AC/DC converting function.

Here, as for fluctuations in voltage of the commercial AC power source Utility, the voltage can be adjusted by a pulse width modulation (PWM) control or a pulse phase modulation (PPM) control of the modulation/demodulation semiconductor switches SW1 and SW2, thereby stably supplying a load voltage with respect to the fluctuations in the commercial AC power source Utility and the DC power sources WTG, PV and FC, and simultaneously, charging can be achieved by the nighttime and midnight electric power via the modulation/demodulation semiconductor switches SW1 and SW3.

In the above-described co-generated power supply systems in the embodiments illustrated in FIGS. 5 and 6, the circuit is configured such that the AC power and the DC power are switched over via contacts CT1, CT2 and CT3 of an AC relay RL, so that the electric power is supplied to the load Lac/dc for both AC and DC, and further, energy of each of the wind turbine generator WTB, the solar cell PV and the fuel cell FC is consumed on the side of the load without any reverse flow of the AC current (i.e., system linkage) on the side of the commercial AC power source via the storage battery B.

Fourth Embodiment

Figure 7:
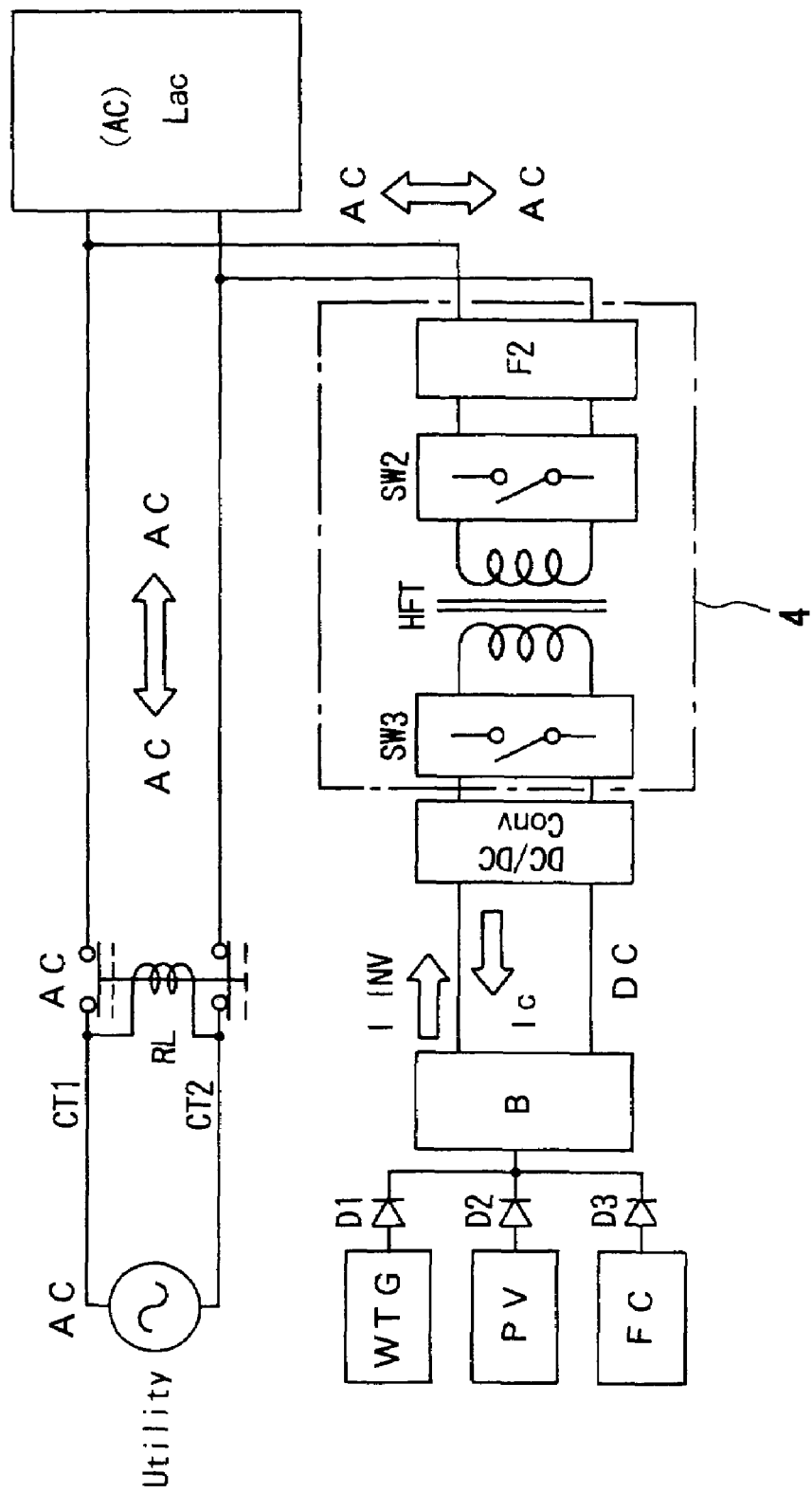
FIG. 7 is a diagram illustrating a still further embodiment according to the present invention.
Figure 8:
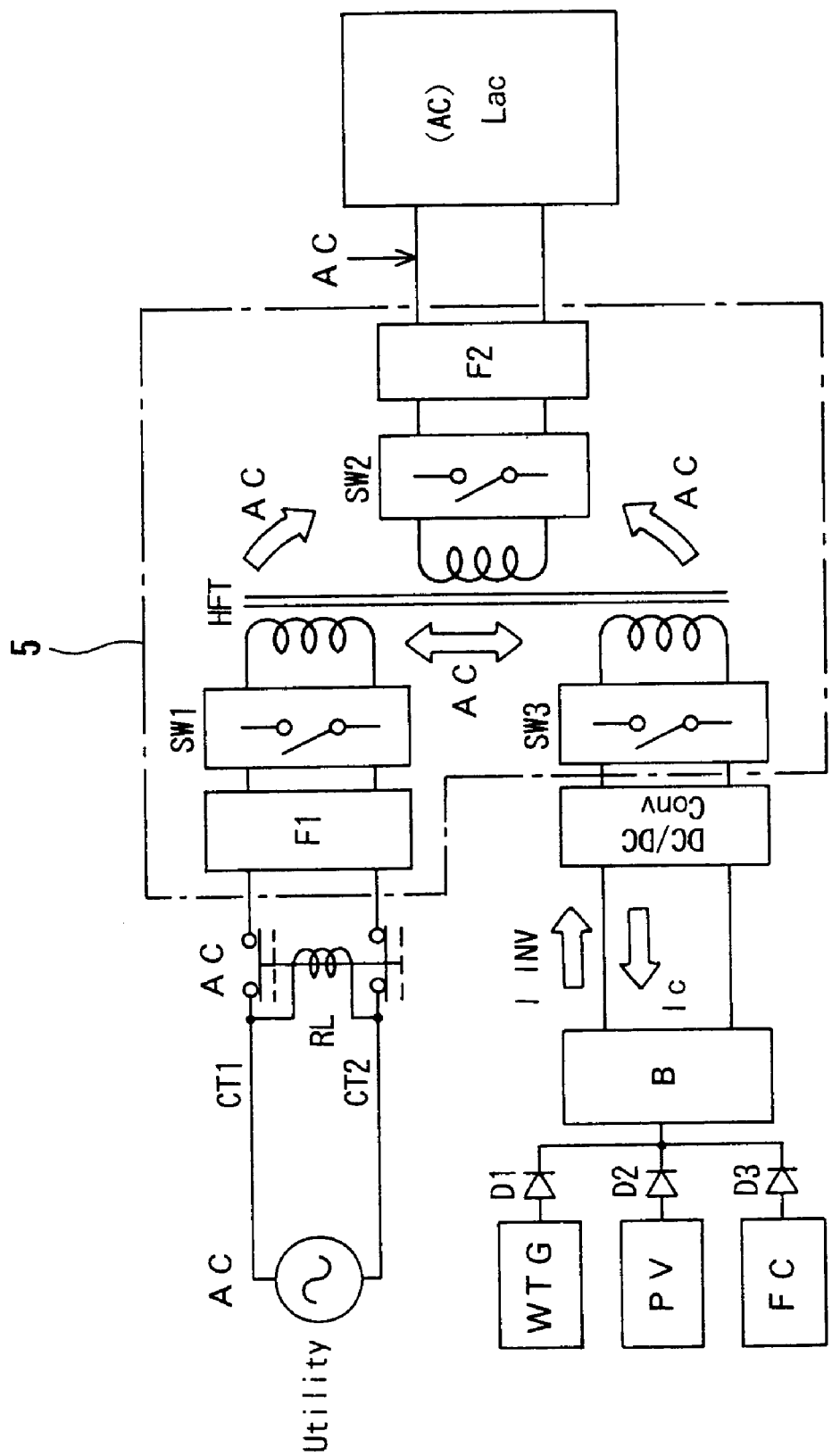
FIG. 8 is a diagram illustrating a still further embodiment according to the present invention.

FIGS. 7 and 8 are diagrams illustrating co-generated power supply systems in still further embodiments according to the present invention. In the co-generated power supply systems in the embodiments illustrated in FIGS. 7 and 8, a storage battery B and a bidirectional DC-DC converter Conv are connected directly to each other, thereby achieving a reverse flow of the AC current. Currently, the reverse flow of nighttime and midnight electric power is not allowed in accordance with an electric charging contract in Japan. However, as for a wind turbine generator and a solar cell, the reverse flow of the AC current is allowed. Although it is not clear with respect to the reverse flow of the AC current at the time of the power generation by a fuel cell, the reverse flow of the AC current is allowed in any case from the viewpoint of pure technique.

In the present embodiments, first, AC power from a commercial AC power source Utility is supplied to a load Lac only for AC via neither the bidirectional DC-DC converter Conv nor a two-winding electronic transformer 4 in FIG. 7 while via a three-winding electronic transformer 5 in FIG. 8 until a storage battery B is fully charged by DC power sources WTG, PV and FC. When the storage battery B has been fully charged or the commercial AC power source Utility fails, DC power from the DC power sources WTG, PV and FC and the storage battery B is supplied to the load Lac only for AC by converting the DC power into a single-phase full-wave rectification waveform by half cycle sinusoidal wave modulation in the bidirectional DC-DC converter Conv, alternately reversing a high frequency modulation phase of two or two pairs, i.e., four, of unidirectional semiconductor switches, not illustrated, which constitute a modulation/demodulation semiconductor switch SW3 connected onto the side of the storage battery in a high frequency transformer HFT in a two-winding electronic transformer 4 illustrated in FIG. 7 or a three-winding electronic transformer 5 illustrated in FIG. 8 per half cycle of a commercial frequency, and then, demodulating to take out a sinusoidal wave AC output by a modulation/demodulation semiconductor switch SW2 connected onto the side of the load of the high frequency transformer HFT. The electric power is replenished from the fuel cell FC when the storage battery is being discharged. The AC power from the commercial AC power source Utility is supplied to the load Lac only for AC in a time zone of the nighttime and midnight electric power supply; and further, the storage battery B is electrically charged by the bidirectional function of the two-winding electronic transformer 4 illustrated in FIG. 7 or the three-winding electronic transformer 5 illustrated in FIG. 8, the AC/DC converting function and a boost type rectifying operation at a high power factor of the bidirectional DC-DC converter Conv at the time of charging. Furthermore, the DC power is converted into the AC power by the energy bidirectional transmitting characteristics of the two-winding electronic transformer 4 illustrated in FIG. 7 or the three-winding electronic transformer 5 illustrated in FIG. 8 when the storage battery B has been almost fully charged at a light load and the commercial AC power source does not fail, for automatic phase synchronization on the side of the commercial AC power source so as to achieve a reverse flow of the AC current.

Figure 9:
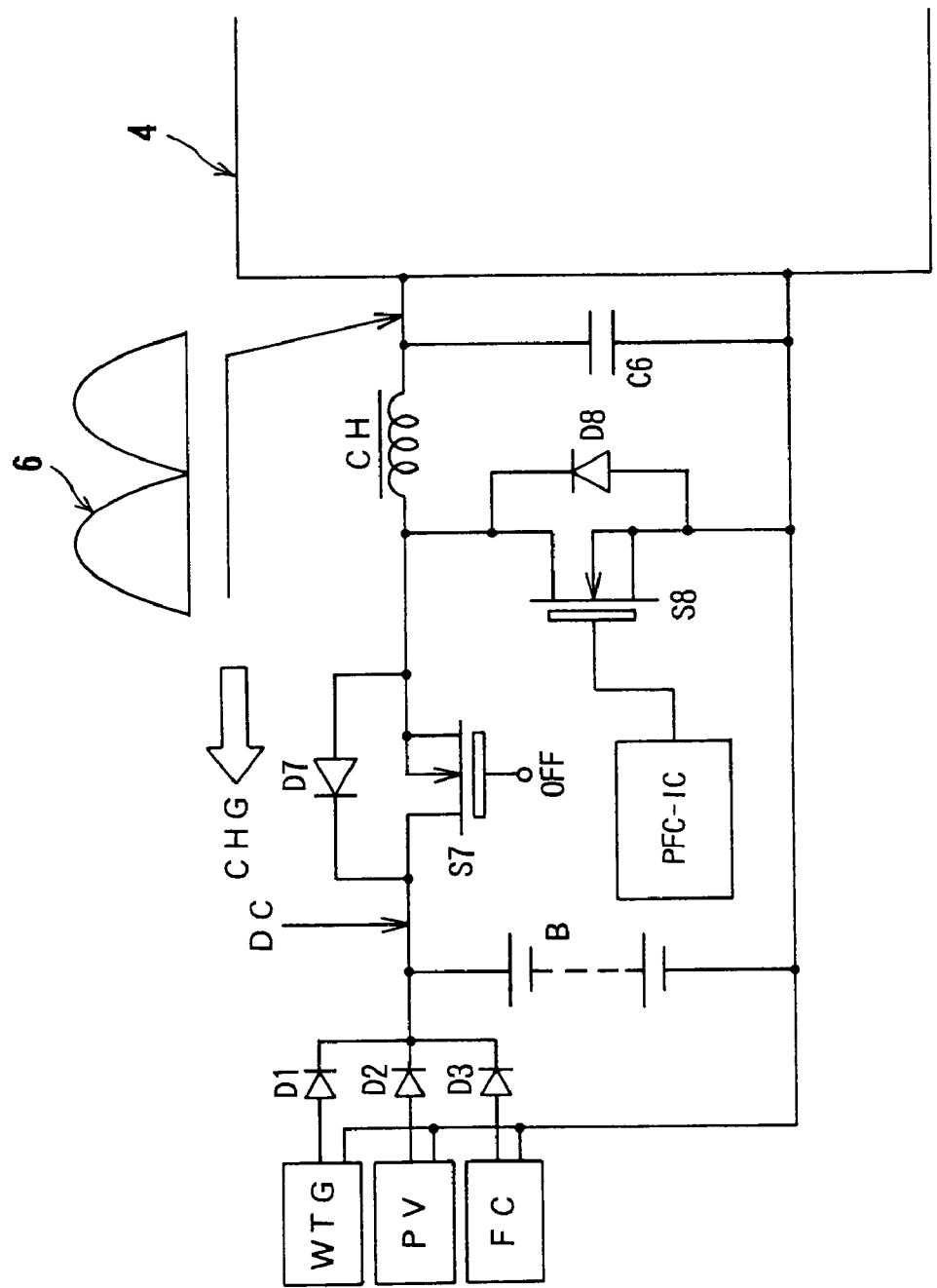
FIG. 9 is a diagram illustrating operation of a bidirectional DC-DC converter in the embodiment illustrated in FIG. 7.

Here, a specific description will be given of a drive system of the bidirectional DC-DC converter Conv in the embodiment illustrated in FIG. 7 in reference to FIGS. 9 and 10. FIG. 9 illustrates an example of operation of an inverter at the time of charging of nighttime or midnight electric power; and FIG. 10 illustrates an example of operation of an inverter in the case of a reverse flow of the DC current from the storage battery B to the load Lac/dc for both AC and DC or the commercial AC power source Utility.

Figure 10:
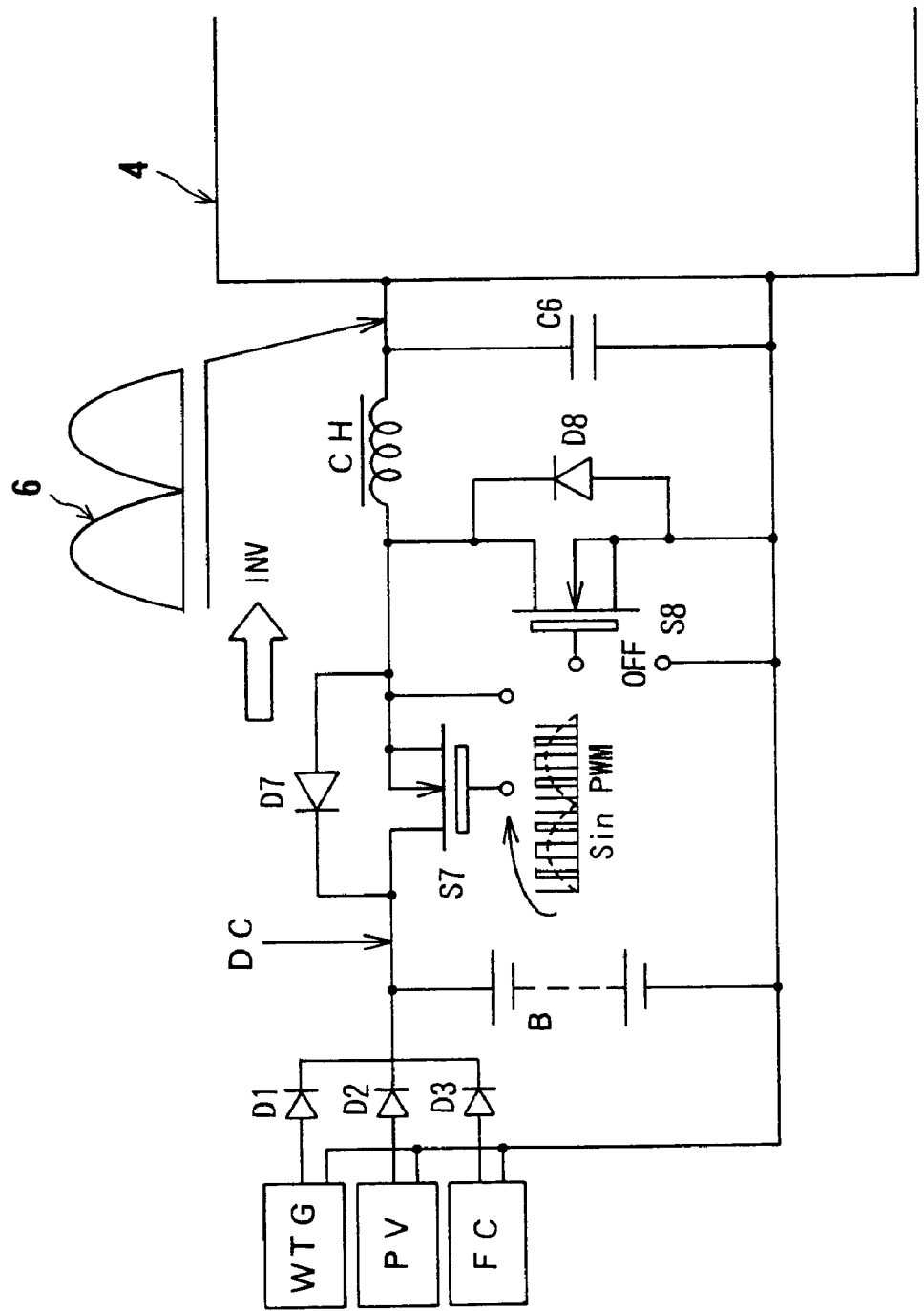
FIG. 10 is another diagram illustrating the operation of the bidirectional DC-DC converter in the embodiment illustrated in FIG. 7.

In FIGS. 9 and 10, switches S7 and S8 and diodes D7 and D8 constituting the bidirectional DC-DC converter Conv (see FIG. 7) are designated by the same reference characters in a circuit device in FIGS. 11 to 14, described later. Other reference characters are the same as those in FIGS. 4 to 8. The modulation/demodulation semiconductor switch SW3 (see FIG. 7) on the side of the storage battery inside of the two-winding electronic transformer 4 can be actually constituted of two unidirectional semiconductor switches S5 and S6, as illustrated later in FIG. 13, or two pairs (i.e., four) of unidirectional semiconductor switches, not illustrated, in the case of a bridge. Moreover, the modulation/demodulation semiconductor switch SW2 (see FIG. 7) on the side of the load can be constituted of two switches S3 and S4, as illustrated in FIG. 13.

In the case where the modulation/demodulation semiconductor switch SW3 on the side of the storage battery is constituted of the two unidirectional semiconductor switches S5 and S6, a DC output voltage 6 of a two-phase half-wave is generated (see FIGS. 9 and 13) at both ends of a capacitor C6 of the bidirectional DC-DC converter Conv in the case of the sinusoidal wave AC in the switches S3 and S4 on the side of the load and the side of the commercial AC power source (see FIG. 13) by switching the drive phase of a modulation wave of the unidirectional semiconductor switches S5 and S6 (see FIG. 13) per half cycle of a commercial frequency. The switch S8 illustrated in FIG. 9 is driven by a normal IC for only use in a boost type power factor correction (i.e., a PFC-IC); in contrast, the other switch S7 is stopped, so that the storage battery B is electrically charged by the energy accumulated in a chock coil CH via the diode D7. The electric charging voltage of the storage battery B becomes higher than an output maximum amplitude of the two-winding electronic transformer 4 because of a boost operation, thereby achieving sufficient charging.

In the meantime, as illustrated in FIG. 10, in the case of the inverter operation in which the sinusoidal wave AC is generated from the storage battery B, the switch S7 is driven in response to a PWM signal whose sinusoidal wave is modulated, thereby generating a two-phase half-wave or single-phase full-wave rectification output 6 on the output side of the filter consisting of the chock coil CH and the capacitor C6. The resultant output is modulated at a high frequency (10 kHz to 50 kHz) by the unidirectional semiconductor switches S5 and S6 (see FIGS. 7 and 13) of the modulation/demodulation semiconductor switch SW3. The drive phase of the modulation pulse is reversed per half cycle of the commercial frequency on the side of the unidirectional semiconductor switches S5 and S6 (see FIGS. 7 and 13) such that the sinusoidal wave is achieved on the side of the switches S3 and S4 (see FIGS. 7 and 13) of the modulation/demodulation semiconductor switch SW2. In this manner, the sinusoidal wave AC output can be taken out on the output side of the two-winding electronic transformer 4, that is, the side of the load and the side of the commercial AC power source.

Furthermore, in the same manner, the system consisting of the commercial AC power source Utility, the load Lac only for the AC and storage battery B is completely insulated by the use of the three-winding electronic transformer 5 illustrated in FIG. 8, and the high frequency transformer HFT can achieve an envelope modulated operation at every sinusoidal wave commercial AC frequency in a winding turn ratio which can match with each voltage value, whereby the load only for AC in the prior art can be used.

Incidentally, although all of the three DC power sources WTB, PV and FC are combined with each other in the above-described embodiments, it is to be understood that the present invention can be applied to the case where only one of the DC power sources is used or arbitrary two of the DC power sources are combined with each other, thus implementing the excellent co-generated power supply system in the same manner.

EXAMPLES

Example 1

Figure 11:
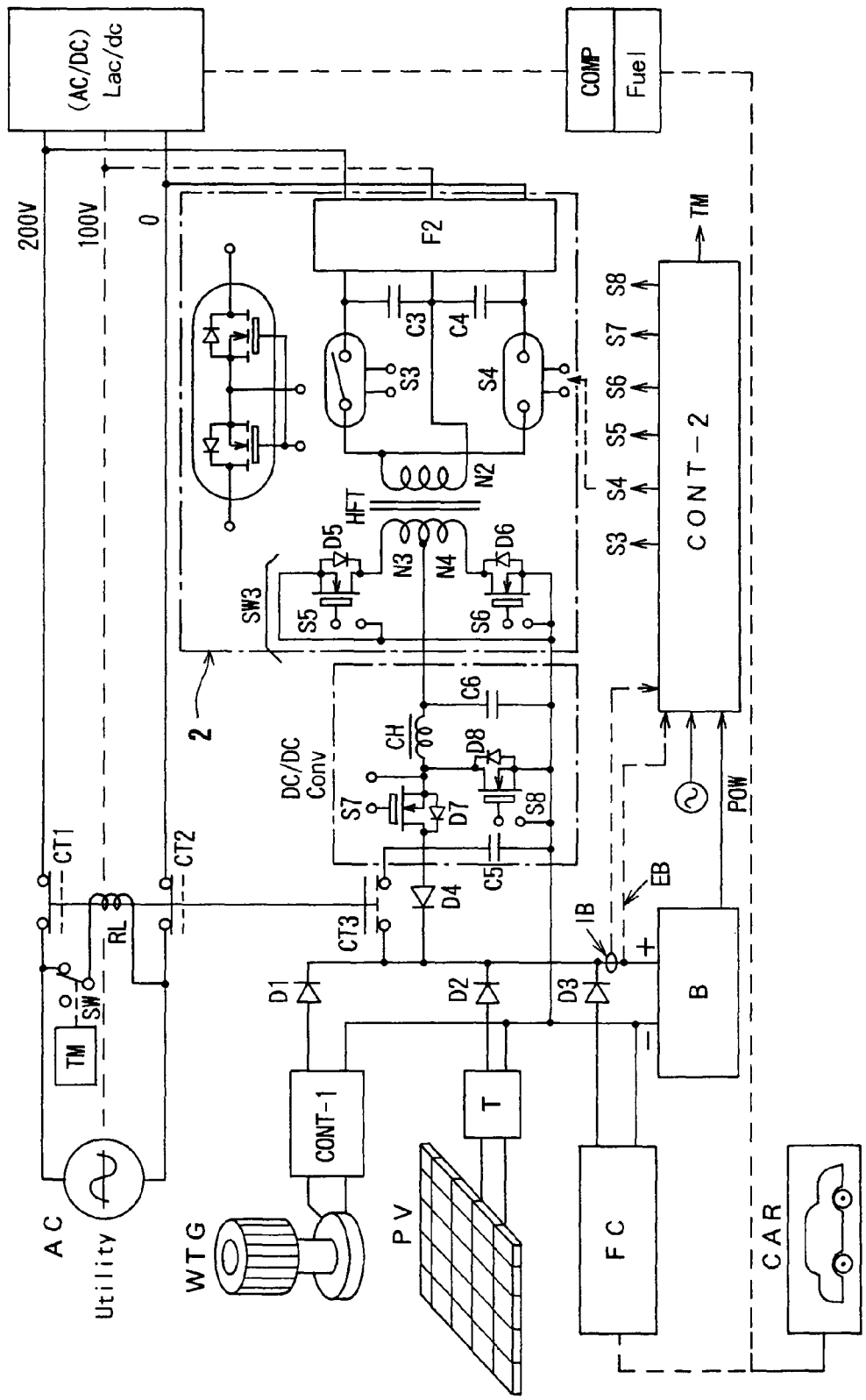
FIG. 11 is a diagram illustrating an example according to the present invention.

FIG. 11 is a specific example of the embodiment illustrated in FIG. 5. Reference characters used here are the same as those used in FIG. 5, and therefore, a description will only be given of additional reference characters.

First of all, reference character TM designates a timer for AC/DC power supply and nighttime and midnight electric power charging, and it is controlled by a control circuit CONT-2. Reference character CONT-1 denotes a control circuit for a wind turbine generator WTG The control circuit CONT-1 is a generally known control circuit for performing rectification in the case where the wind turbine generator WTG is operated by AC, like in a generator for an automobile while for performing voltage adjustment as it is in the case where the wind turbine generator WTG is operated by DC. Reference characters S3 and S4 designate bidirectional semiconductor switches, in which two unidirectional semiconductor switches are connected back to back (i.e., Back to Back Connection) for switching AC and DC, as enlarged in FIG. 11. Reference characters S5 to S8 denote unidirectional semiconductor switches; D5 to D8 denote internal or external diodes; C1 to C6 denote capacitors; CH denotes a choke coil; and N2 to N4 denote coils for a high frequency transformer HFT.

In the example illustrated in FIG. 11, at the time of AC power supply from a commercial AC power source Utility, the unidirectional semiconductor switches S5 to S7 are stopped, and a DC voltage is generated across the capacitor C6 via the bidirectional semiconductor switches S3 and S4, the high frequency transformer HFT and the diodes D5 and D6. A storage battery B can be charged by adjusting the DC voltage via the unidirectional semiconductor switch S8 and the diode D7. Simultaneously, AC power is supplied to a load Lac/dc for both AC and DC. Here, a solar cell during the daytime or wind turbine generator irrespective of a time zone may be mainly used while the charging by the use of the commercial AC power source Utility may be auxiliary or may not be performed. At the time of a failure of the commercial AC power source Utility, the AC power supply is immediately switched to DC power supply from DC power sources WTG, PV and FC and the storage battery B owing to restoration of an AC relay RL, and then, the DC power is supplied onto the side of the load through a two-winding electronic transformer 2, so that the load Lac/dc for both AC and DC can continue to be operated. At this time, only the unidirectional semiconductor switch S8 is stopped, and therefore, the DC voltage is controlled, that is, is adjusted to be decreased by the unidirectional semiconductor switch S7 and the diode D8. The fuel cell FC is operated according to the discharging of the storage battery B, thereby continuing the discharging.

Although the above description has been given of the case of a long failure time of the commercial AC power source Utility, a switch SW is turned off by the timer TM in response to a command from the control circuit CONT-2 in the case where the storage battery B has been fully charged even without any failure, so that the AC power supply is switched to the DC power supply, thus achieving a co-generated power supply by natural energy and the fuel cell.

Example 2

Figure 12:
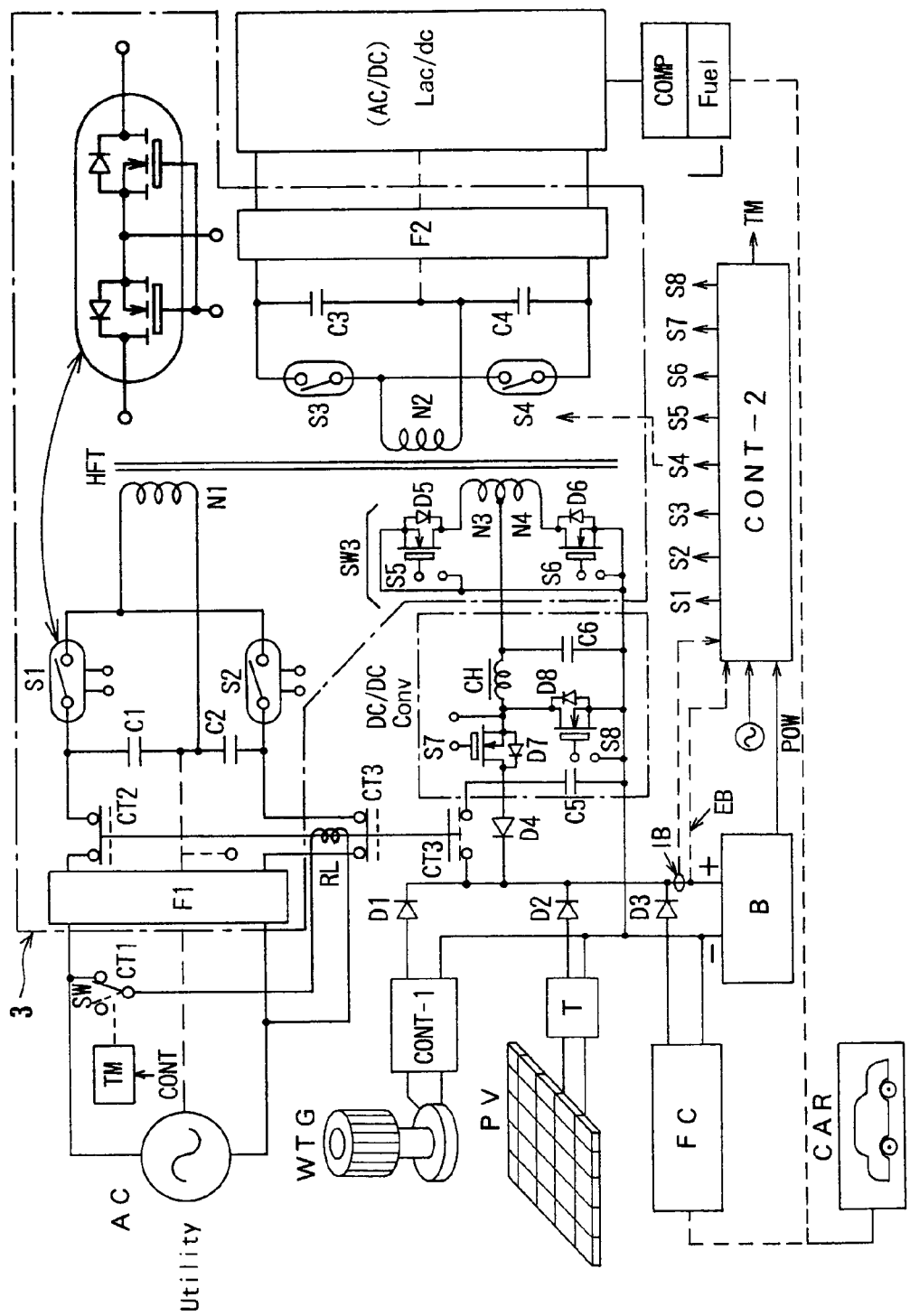
FIG. 12 is a diagram illustrating another example according to the present invention.
Figure 13:
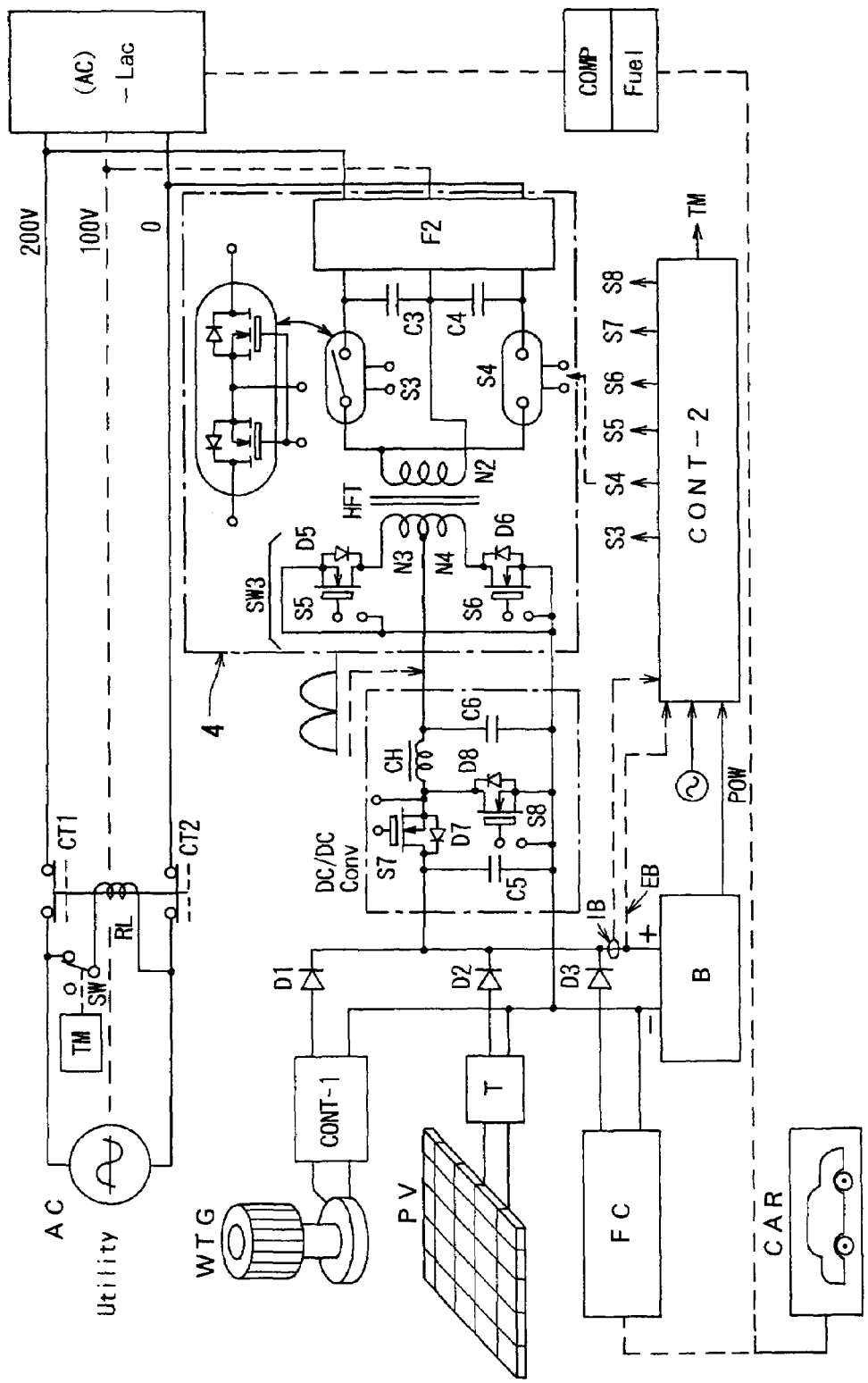
FIG. 13 is a diagram illustrating a further example according to the present invention.

FIG. 12 is a specific example of the embodiment illustrated in FIG. 6. In the example illustrated in FIG. 12, an electronic transformer is a type of three-windings, for insulating each of the power sources from a load and stabilizing fluctuations of a commercial AC power source Utility by a PWM or PPM control, as described above. Explanation will be made below on schematic operation of a three-winding electronic transformer 3 in this case.

Figure 15:
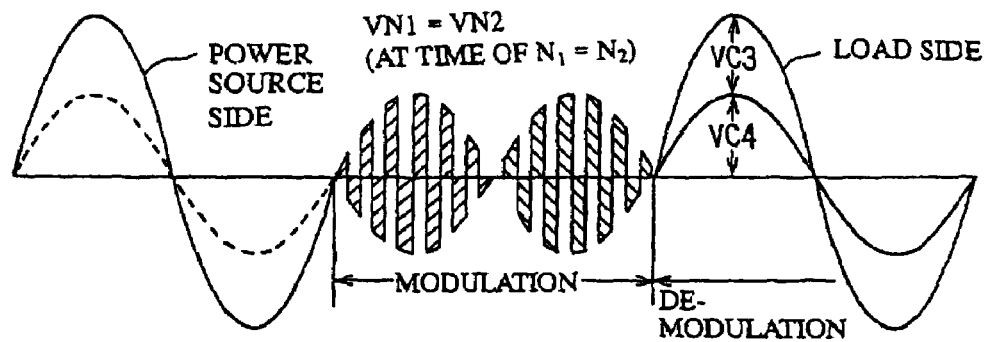
FIGS. 15A to 15C are charts illustrating schematic operation of a three winding electronic transformer.
Figure 15:
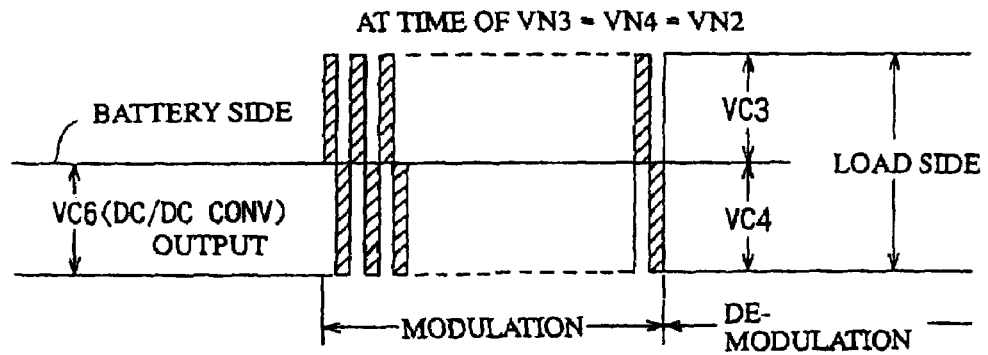
Figure 15:
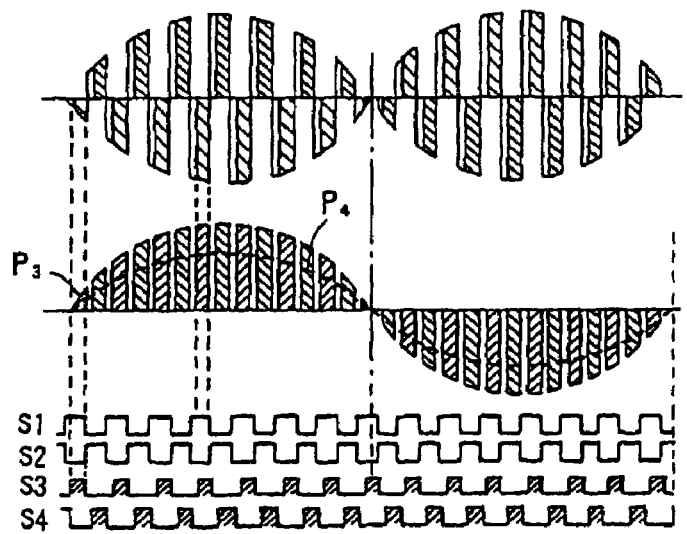

FIGS. 15A to 15C are waveform diagrams illustrating the schematic operation of the three-winding electronic transformer 3. A waveform on the left in FIG. 15A illustrates an input commercial AC voltage after passing through a filter F1, that is, a terminal voltage on a side of an AC input of the three-winding electronic transformer 3. This input waveform is subjected to high-frequency ring modulation by a half bridge circuit consisting of capacitors C1 and C2 and switches S1 and S2, as illustrated at the center of FIG. 15A, and then, is added to a primary coil N1 in a high frequency transformer HFT. Now, in the case where the number of coils of a secondary coil N2 is the same as that of the primary coil N1, a voltage twice a voltage generated in the secondary coil N2 is demodulated by another half bridge consisting of switches S3 and S4 and capacitors C3 and C4 (which is operated as a voltage-doubler circuit in this case). As for a drive timing of the switch in this case, the switches S1 and S3 and the switches S2 and S4 are driven at the same timing. In other words, a sinusoidal AC waveform representing an original signal is reproduced on the side of demodulation as it is by the high frequency modulation/demodulation technique, and therefore, only the transformer is reduced in size and weight by high frequency modulation, thus enhancing the efficiency in comparison with a commercial transformer. At this time, it is understood that a high frequency AC generated in coils N3 and N4 should be rectified by diodes D5 and D6, and then, a storage battery B can be charged by a bidirectional DC-DC converter Conv at the same time.

Next, when the commercial AC power source Utility fails or the storage battery B has been fully charged, a high frequency rectangular wave signal is generated by a push-pull type inverter circuit with the coils N3 and N4 and semiconductor switches S5 and S6 in the high frequency transformer HFT. At this time, a rectangular wave voltage generated in the coil N2 by the switches S3 and S4 becomes a DC having a double voltage value by the voltage-doubler circuit, and thus, DC power is supplied to a load Lac/dc for both AC and DC. That is to say, the electronic transformer operated by the high frequency modulation/demodulation can convert the voltage irrespective of the AC and the DC.

FIG. 15B illustrates, at the center thereof, a voltage in the high frequency transformer HFT in the case where a DC input is added to the coils N3 and N4. FIG. 15C illustrates one example, in which the switches S3 and S4 on the side of the secondary coil are subjected to a known PWM control so as to adjust the voltage on the side of the load. Although the AC modulation/demodulation has been illustrated, it is understood that the control should be performed in completely the same manner also in the case of the DC input.

Incidentally, if compressed fuel Fuel (containing mainly hydrogen) for a fuel cell FC is produced as a part of the load by a compressor COMP at a light load, and then, is reserved, the capacity of the storage battery can be reduced and the fluctuation in load can be leveled or environmental improvement prepared for a clean engine age can be achieved for use in self-generation of electricity, a motor-driven vehicle and the like.

Example 3

Figure 14:
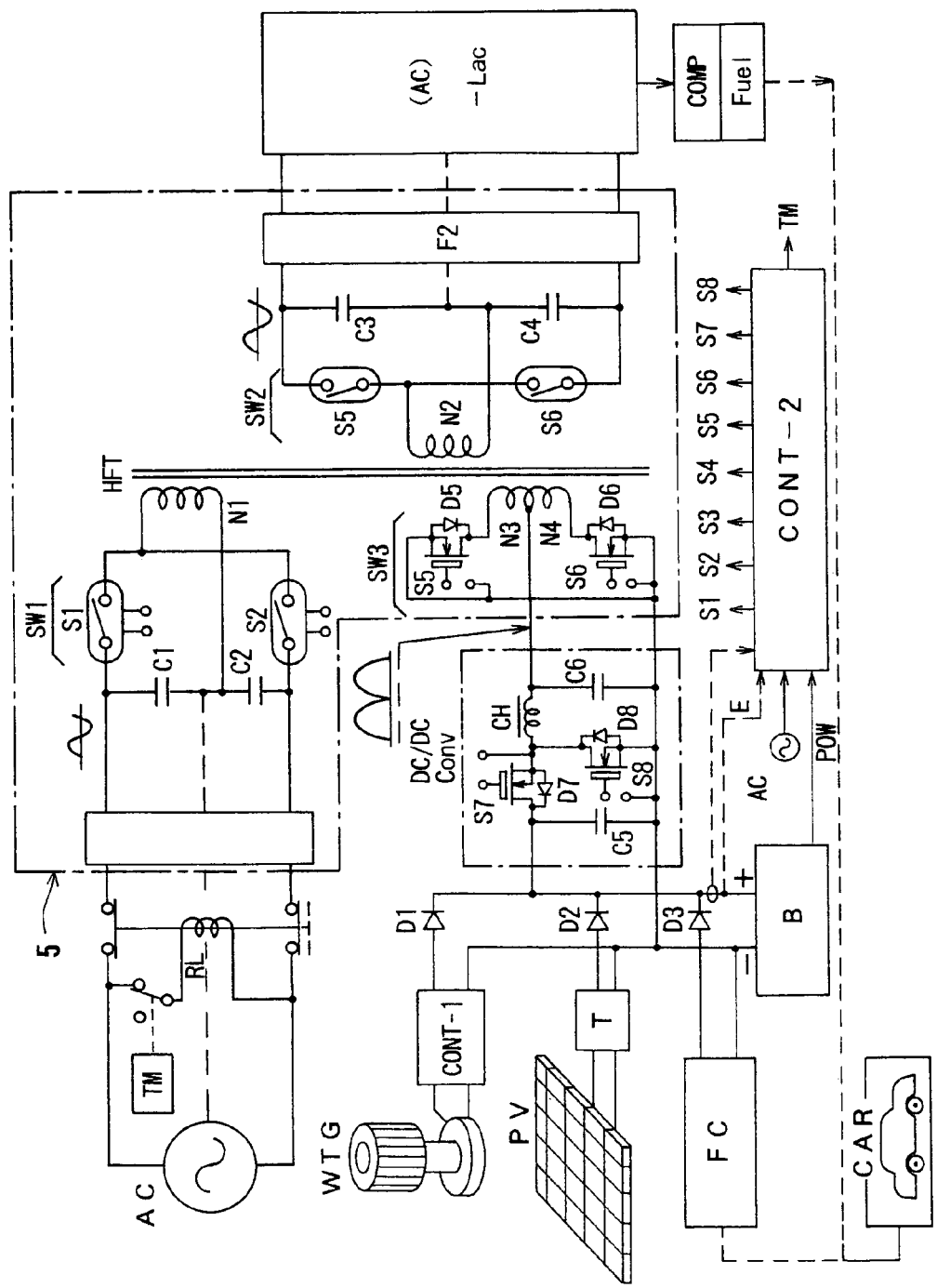
FIG. 14 is a diagram illustrating a still further example according to the present invention.

FIGS. 13 and 14 are more specific examples of the embodiments illustrated in FIGS. 7 and 8, respectively. The limitation of the load Lac/dc for both AC and DC illustrated in FIGS. 11 and 12 is eliminated, and thus, importance is put on the integrity with existing equipment only for AC. At the same time, a reverse flow of the AC current can be achieved on a side of a commercial AC power source Utility from a DC source through an electronic transformer. FIG. 13 illustrates the case where a commercial AC power source Utility and a load Lac only for an AC are connected to each other via a two-winding electronic transformer 4 only on a side of a storage battery B. FIG. 14 illustrates the case where DC power sources WTG, PV and FC, a storage battery B and a commercial AC power source Utility and a load Lac only for an AC are connected to each other via a three-winding electronic transformer 5 in a mutually insulating manner.

A great difference from the cases illustrated in FIGS. 11 and 12 is in that unidirectional semiconductor switches S5 and S6 are operated at the time of both charging and discharging in the cases illustrated in FIGS. 13 and 14. Furthermore, as illustrated in FIGS. 9 and 10, the voltage of a storage battery and a two-phase half-wave or single-phase full-wave rectification output 6 are converted both forward and backward in the bidirectional DC-DC converter Conv, and then, AC modulation or demodulation conversion is performed in the unidirectional semiconductor switches S5 and S6, so that operation always is performed only with an AC modulation component inside of the two-winding electronic transformer 4 or the three-winding electronic transformer 5. In this manner, an AC output can be taken out at all times on the side of the load only for the AC irrespective of the AC power supply or the DC power supply.

In order to implement the above-described operation, the drive pulse phase of switches S1 to S6 in the three-winding electronic transformer 5 is alternately reversed for a positive half cycle and a negative half cycle of the commercial AC power source Utility, as illustrated in, for example, FIGS. 16A and 16B, so that voltages $v_1$ and $v_2$ are operated in an AC sinusoidal waveform at all times. While a DC input/output of a single-phase full-wave or two-phase half-wave is generated at a $v_3$ terminal in a DC circuit, an AC modulation operation can be performed with a change in magnetic flux in the three-winding electronic transformer 5, as illustrated in FIG. 15A, as described above.

Figure 16:
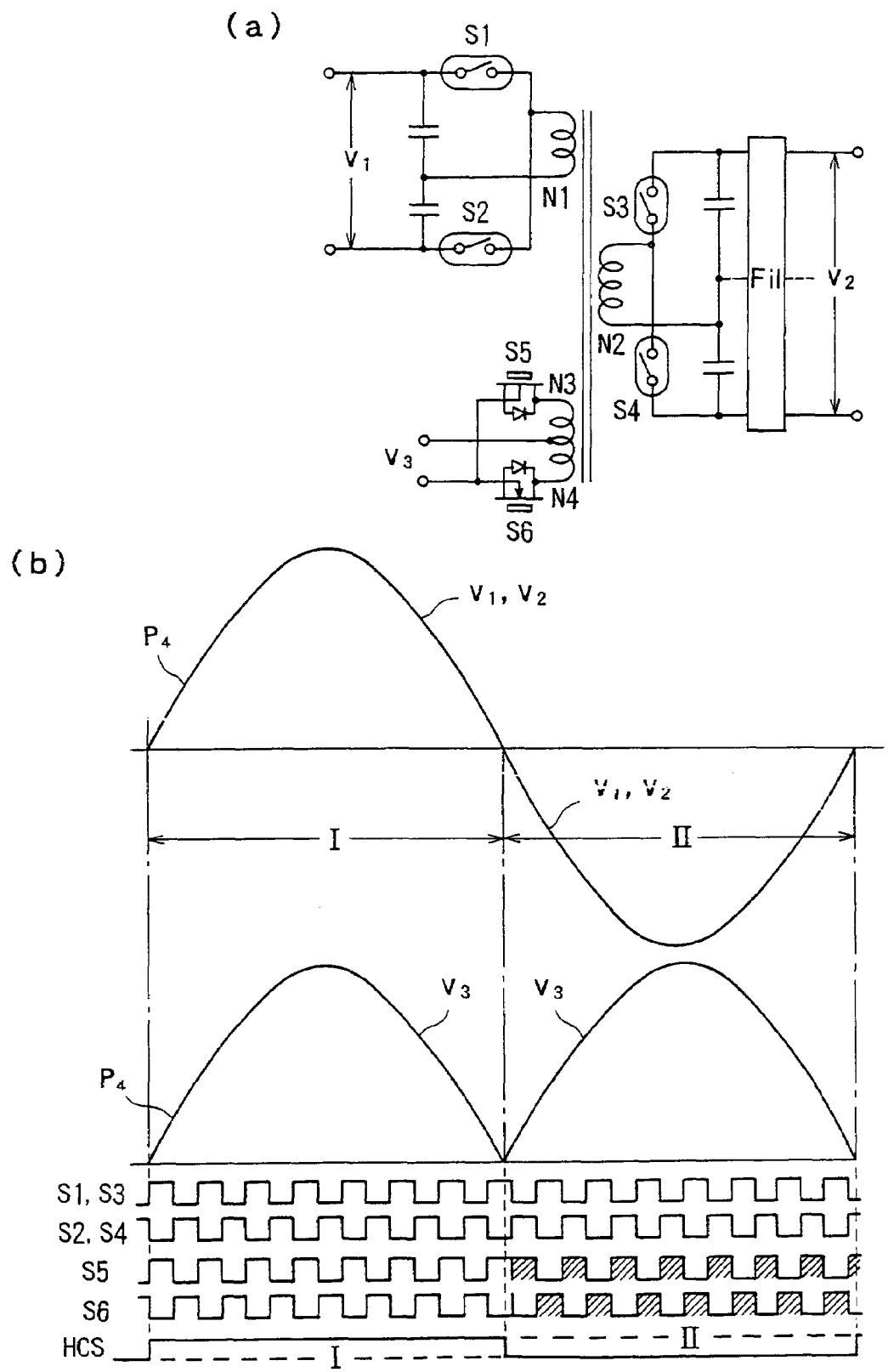
FIGS. 16A and 16B are charts illustrating the operational principle of AC to DC conversion of the three-winding electronic transformer.

The two-winding electronic transformer 4 illustrated in FIG. 13 corresponds to that in the case where there is no coil N1 in FIG. 16, and therefore, it is understood that the other operation should be utterly the same.

At any rate, a great difference from a commercial power transformer resides in that the bidirectional transmission of the electric energy can be achieved at both the DC and several hundreds Hz of the AC between input/output terminals in the two or three pairs of two-winding electronic transformers 4 and three-winding electronic transformers 5. This point is a basic feature of the system configuration according to the present invention.

Moreover, another feature resides in that a reverse flow of the current can be achieved from the side of the storage battery onto the side of the commercial AC power source through the two-winding electronic transformer 4 and the three-winding electronic transformer 5 unless the commercial AC power source Utility fails. Incidentally, in this case, it is understood that an oscillator for an inverter operation at the time of a failure should be built in the system.

As the detailed descriptions have been given above, according to the present invention, there can be provided the novel co-generated power supply system, in which the electric power of the natural energy system having many fluctuation factors is combined with the stable electric power such as the midnight electric power or the fuel cell, so that the stable electric power is supplied to the load via the electronic transformer commonly used at a usage rate of almost 100%, thus reducing the cost and enhancing the performance of the entire system, so as to spread and make prevalent the co-generated power supply and save the energy.

Of course, the present invention is not restricted to the particular embodiments and examples given above, and that various aspects can be realized in detail without departing from the scope of the present invention.

What is claimed is:

1. A power supply system for selectively supplying power to a load that operates with both AC power and DC power, the power supply system comprising;
    a storage battery that stores DC power;
    a plurality of DC power sources including a wind turbine generator, a solar cell and a fuel cell, each having a rated voltage made equal to a rated voltage of the storage battery, and an output of each being connected to the storage battery;
    a switching device connected in series between a utility AC power source and the load, and connected in series between the storage battery and the load, the switching device switching between supplying power from the utility AC power source to the load and supplying power from the storage battery to the load;
    a bidirectional converter;
    a three-winding electronic transformer having a first bidirectional terminal for connection to the storage battery, a second bidirectional terminal for connection to the utility AC power source, a third bidirectional terminal for connection to the load, a high frequency transformer that matches and insulates a voltage on a storage battery side of the three-winding electronic transformer and a voltage on a load side of the three-winding electronic transformer, a first modulation/demodulation semiconductor switch connected to a winding at the storage battery side, a second modulation/demodulation semiconductor switch connected to a winding at a utility AC power source side of the three-winding electronic transformer, and a third modulation/demodulation semiconductor switch connected to a winding at the load side; and
    a controller that controls operation of the three-winding electronic transformer by controlling operation of the switching device, wherein
    the three-winding electronic transformer has a bidirectional function and an AC/DC converting function,
    the first bidirectional terminal of the three-winding electronic transformer is connected via the bidirectional converter and the storage battery to the DC power sources,
    the second bidirectional terminal of the three-winding electronic transformer is connected via the switching device to the utility AC power source,
    the first, second and third bidirectional terminals are insulated from each other, and
    the controller controls the operation of the three-winding electronic transformer to (1) during a first time period, (i) supply AC power from the utility AC power source to the load while the storage battery is being charged by at least one of the DC power sources until the storage battery is fully charged and (ii) supply DC power from the storage battery to the load once the storage battery has been fully charged or if the utility AC power source fails, and (2) during a second time period, (i) supply the AC power from the utility AC power source to the load and (ii) convert the AC power from the utility AC power source into DC power and supply the DC power to the storage battery to charge the storage battery by the bidirectional function and the AC/DC converting function of the three-winding electronic transformer, and
    the fuel cell charges the storage battery while the storage battery is being discharged.

2. A power supply system for selectively supplying power to a load that operates with only AC power, the power supply system comprising:
    a storage battery that stores DC power;
    a plurality of DC power sources including a wind turbine generator, a solar cell and a fuel cell, each having a rated voltage made equal to a rated voltage of the storage battery, and an output of each being connected to the storage battery;
    a switching device connected in series between a utility AC power source and the load;
    a bidirectional converter;
    a three-winding electronic transformer having a first bidirectional terminal for connection to the storage battery, a second bidirectional terminal for connection to the utility AC power source, a third bidirectional terminal for connection to the load, a high frequency transformer that matches and insulates a voltage on a storage battery side of the three-winding electronic transformer and a voltage on a load side of the three-winding electronic transformer, a first modulation/demodulation semiconductor switch connected to a winding at the storage battery side, a second modulation/demodulation semiconductor switch connected to a winding at a utility AC power source side of the three-winding electronic transformer, and a third modulation/demodulation semiconductor switch connected to a winding of the load side; and
    a controller that controls operation of the three-winding electronic transformer by controlling operation of the switching device, wherein
    the three-winding electronic transformer has a bidirectional function and an AC/DC converting function, the first bidirectional terminal of the three-winding electronic transformer is connected via the bidirectional converter and the storage battery to the DC power sources, the second bidirectional terminal of the three-winding electronic transformer is connected via the switching device to the utility AC power source, the first, second and third bidirectional terminals are insulated from each other, the first modulation/demodulation semiconductor switch includes two unidirectional switches or two pairs of unidirectional switches, the controller controls the operation of the three-winding electronic transformer to (1) during a first time period, (i) supply AC power from the utility AC power source to the load while the storage battery is being charged by at least one of the DC power sources until the storage battery is fully charged and (ii) supply AC power from DC power stored in the storage battery to the load once the storage battery has been fully charged or if the AC power source fails by demodulating the DC power into single-phase full-wave form per half cycle by the bidirectional converter, alternately reversing a high frequency modulation phase of the two unidirectional switches or the two pairs of unidirectional switches of the first modulation/demodulation semiconductor switch per half cycle of a utility AC power frequency and then demodulating into sinusoidal wave AC output by the third modulation/demodulation semiconductor switch, and (2) during a second time period, (i) supply the AC power from the utility AC power source to the load and (ii) convert the AC power from the utility AC power source into DC power and supply the DC power to the bidirectional converter to perform a boost type rectifying operation at a high power to the DC power and supplying the DC power to the storage battery to charge the storage battery by the bidirectional function and the AC/DC conversion function of the three-winding electronic transformer, the three-winding electronic transformer converts the DC power from the storage battery into AC power when the storage battery has been substantially fully charged at a load in an off-peak period for the electric power supply and the utility AC power source has not failed on a side of the three-electronic transformer of the utility AC power source to achieve a reverse flow of the AC current, and the fuel cell charges the storage battery while the storage battery is being discharged.

\* \* \* \* \*